United States Patent [19]
Andreski et al.

[11] Patent Number: 6,004,612
[45] Date of Patent: Dec. 21, 1999

[54] PRODUCTION OF SHREDDED SNACKS WITH CHIP-LIKE APPEARANCE AND TEXTURE

[75] Inventors: Henry M. Andreski, Whippany, N.J.; Guy Scappatura, Staten Island; Duane C. Runge, Jr., Wilson, both of N.Y.; Diane L. Hnat, Danbury, Conn.; Robert J. Cordera, East Amherst; Richard Sonberg, Newfane, both of N.Y.

[73] Assignee: Nabisco Technology Company, Wilmington, Del.

[21] Appl. No.: 08/995,196

[22] Filed: Dec. 19, 1997

[51] Int. Cl.⁶ .............................. A21D 2/36; A23L 1/168
[52] U.S. Cl. ..................... 426/618; 426/450; 426/458; 426/463; 426/454; 426/518; 426/560; 99/80
[58] Field of Search .................................. 426/618, 450, 426/458, 463, 454, 518, 560; 99/80

[56] References Cited

U.S. PATENT DOCUMENTS

| | | | |
|---|---|---|---|
| 502,378 | 8/1893 | Perky et al. | 425/322 |
| 548,086 | 10/1895 | Perky | 426/620 |
| 713,795 | 11/1902 | Perky | 426/560 |
| 820,899 | 5/1906 | Williams | 426/620 |
| 1,170,162 | 2/1916 | Kellogg | 426/620 |
| 1,197,297 | 9/1916 | Kellogg | 426/620 |
| 1,975,326 | 10/1934 | Loose et al. | 107/54 |
| 2,008,024 | 7/1935 | Loose | 426/560 |
| 2,013,003 | 9/1935 | Loose | 426/620 |
| 2,421,216 | 5/1947 | Penty | 99/63 |
| 2,693,419 | 11/1954 | Gager | 426/93 |
| 2,823,625 | 2/1958 | Oakes | 107/54 |
| 3,278,311 | 10/1966 | Brown et al. | 99/80 |
| 3,332,781 | 7/1967 | Benson et al. | 99/81 |
| 3,348,950 | 10/1967 | Weiss | 99/80 |
| 3,545,979 | 12/1970 | Ghafoori | 99/83 |
| 3,563,104 | 2/1971 | Schuster | 74/395 |
| 3,698,309 | 10/1972 | Steels | 99/450 |
| 3,753,735 | 8/1973 | Gerkens | 99/100 |
| 3,935,322 | 1/1976 | Weiss et al. | 426/439 |
| 3,956,517 | 5/1976 | Curry et al. | 426/502 |
| 3,997,684 | 12/1976 | Willard | 426/550 |
| 4,004,035 | 1/1977 | Hirzel et al. | 426/275 |

(List continued on next page.)

FOREIGN PATENT DOCUMENTS

| | | |
|---|---|---|
| 674046 | 11/1963 | Canada . |
| 1525631 | 9/1978 | United Kingdom . |
| 2111816 | 7/1983 | United Kingdom . |

OTHER PUBLICATIONS

*Wheat Chemistry and Technology*, vol. II, Y. Pomeranz, ed., American Association of Cereal Chemists, Inc., p. 285 (1988).

Atwell et al., "The Terminology and Methodology Associated with Basic Starch Phenomena", *Cereal Foods World*, vol. 33, No. 3, pp. 306–311 (1988).

*Primary Examiner*—Nina Bhat

[57] ABSTRACT

Thin, crisp, baked snacks having a chip-like appearance are continuously produced from a cooked, shredded laminate by substantially compressing the laminate without deleteriously affecting the attainment of a substantially uniform, visually apparent shred or woven pattern in the final, baked product. Additionally, at least substantially all, or all of the individual shred layers maintain their integrity and may be viewed in the final, baked product. The substantial compression is achieved by supporting the laminate of cooked, net-like sheets on a conveyer belt, and passing the supported laminate and belt between at least one pair of counterrotating compression rolls. Substantial movement or slippage of the laminate relative to the belt which would substantially disrupt or distort the shred pattern of the laminate is avoided. The substantial compression of the laminate provides a thin, flat, chip-like appearance rather than a puffed or thick biscuit or cracker appearance. The compressed laminate is preferably partially cut into triangular shaped pieces having flattened, blunted or rounded corners by a rotary cutter so that the apex or point of a triangle in one row does not touch or intersect the apex or point of another triangle located in an adjacent row.

30 Claims, 2 Drawing Sheets

U.S. PATENT DOCUMENTS

| | | | |
|---|---|---|---|
| 4,126,706 | 11/1978 | Hilton | 426/438 |
| 4,266,920 | 5/1981 | Hayashi et al. | 425/335 |
| 4,293,582 | 10/1981 | Hamann et al. | 426/637 |
| 4,362,754 | 12/1982 | Wenger et al. | 426/503 |
| 4,455,321 | 6/1984 | Glabe et al. | 426/549 |
| 4,508,739 | 4/1985 | Ryan | 426/144 |
| 4,517,204 | 5/1985 | Mottur et al. | 426/448 |
| 4,528,202 | 7/1985 | Wang et al. | 426/550 |
| 4,567,051 | 1/1986 | Baker et al. | 426/438 |
| 4,615,901 | 10/1986 | Yoshioka et al. | 426/656 |
| 4,640,843 | 2/1987 | Matuszak et al. | 426/560 |
| 4,645,679 | 2/1987 | Lee, III et al. | 426/560 |
| 4,650,687 | 3/1987 | Willard et al. | 426/438 |
| 4,696,825 | 9/1987 | Leibfred | 426/283 |
| 4,734,294 | 3/1988 | Spiel et al. | 426/620 |
| 4,769,253 | 9/1988 | Willard | 426/559 |
| 4,770,891 | 9/1988 | Willard | 426/59 |
| 4,834,996 | 5/1989 | Fazzolare et al. | 426/302 |
| 4,855,151 | 8/1989 | Fielding | 426/144 |
| 4,861,609 | 8/1989 | Willard et al. | 426/550 |
| 4,873,093 | 10/1989 | Fazzolare et al. | 426/28 |
| 4,876,101 | 10/1989 | Willard | 426/549 |
| 4,880,371 | 11/1989 | Spinelli et al. | 425/135 |
| 4,889,733 | 12/1989 | Willard et al. | 426/438 |
| 4,889,737 | 12/1989 | Willard et al. | 426/143 |
| 4,931,303 | 6/1990 | Holm et al. | 426/445 |
| 4,994,295 | 2/1991 | Holm et al. | 426/549 |
| 5,104,673 | 4/1992 | Fazzolare et al. | 426/549 |
| 5,320,858 | 6/1994 | Fazzolare et al. | 426/549 |
| 5,429,834 | 7/1995 | Addesso et al. | 426/549 |
| 5,470,599 | 11/1995 | Ruhe | 426/231 |
| 5,500,240 | 3/1996 | Addesso et al. | 426/560 |
| 5,595,774 | 1/1997 | Leibfred et al. | 426/93 |
| 5,695,804 | 12/1997 | Hnat et al. | 426/550 |
| 5,770,248 | 6/1998 | Leibred et al. | 426/93 |

PRODUCTION OF SHREDDED SNACKS WITH CHIP-LIKE APPEARANCE AND TEXTURE

FIELD OF THE INVENTION

The present invention relates to a process and apparatus for the production of shredded snacks which possess a thin, chip-like appearance and crispy, chip-like texture.

BACKGROUND OF THE INVENTION

In the production of shredded wheat ready-to-eat cereal biscuits and shredded wheat wafers from whole grains, a plurality of shredded layers are laminated upon one other, and the laminate is cut, dockered, and baked to provide products having a distinctly visible shred pattern on their opposing major surfaces. The shreds provide visual attractiveness and a unique, crispy texture and connote a healthy, hearty, natural product. Also, the shreds provide increased surface area and deliver a robust flavor. Production of a thin, chip-like baked product from shreds would provide an attractive, flavorful, crispy, wholesome hand-to-mouth baked snack product.

The number of shred layers generally contributes substantially to the puffed, pillowed appearance of ready-to-eat cereal biscuits, and the thick, cracker-like appearance of shredded wheat wafers. The number of shred layers may range up to about 21 layers, with the larger number of sheets being reserved for larger sized biscuits as disclosed in U.S. Pat. No. 4,696,825 to Leibfred and U.S. Pat. No. 5,595,774 to Leibfred et al. As disclosed in U.S. Pat. No. 4,696,825 spoon-sized ready-to-eat cereal biscuits generally have from about 6 layers to about 12 layers. Shredded wheat wafers generally have from about 8 layers to about 12 layers as taught in U.S. Pat. No. 5,595,774.

In addition, when many or even a few shredded layers are laminated, the shred pattern of one layer does not exactly line up with the shred pattern of an adjacent layer thereby creating inter-layer voids or slight surface unevenness from layer to layer. Also, slight ripples may be present across the width of a layer. Additionally, as disclosed in U.S. Pat. No. 548,086 to Perky, the filaments or threads discharged by means of a comb or scraper from the grooves of the shredding rolls have a sinuous form and rough or jagged exterior shape which is designed to also provide small interstices throughout the mass, which aerate and lighten the final product. The use of excessive tautness during layer deposition to substantially eliminate ripples or the sinuous form and rough exterior may result in tearing of the layer. As a result of the slight mis-alignment, and surface layer unevenness, the thickness of the laminate is generally substantially greater than the sum of the thicknesses of the individual layers prior to lamination.

Additionally, upon baking and drying of the dough-like laminate, escaping moisture and hot gases tend to separate the layers even more and contribute to a puffed or pillowed appearance or thick, cracker-like appearance, rather than a thin, chip-like appearance.

Thus, just reducing the number of shred layers does not necessarily result in a in chip-like appearance. Additionally, excessive reduction in the number of shred layers may substantially reduce the strength of the laminate and its ability to continuously undergo cutting, transferring, and packaging operations during mass production. Also, the baked product may be too light and fragile for dipping.

U.S. Pat. No. 713,795 to Perky discloses that in baking of wheat filaments it has been found that there is a tendency for the biscuit to become loose or somewhat open in its middle portion, owing to the swelling in the baking process. The loose structure, it is disclosed, is not suitable for the flattened or cracker form. It is taught that compressing the material by a mashing action, injures the filamentous structure which is responsible for the product's light and porous character. Baking irons having teeth studding their inside surfaces are used to hold the filamentous material during baking. The pressure between the points of the teeth is sufficient to cause the locking of the filaments by direct attachment to each other at regular intervals, so that the cracker will hold its form. However, the use of dockering creates a biscuit or cracker appearance rather than a thin, chip-like appearance. Also, it has been found that dockering creates dense areas which are difficult to bake out without burning or scorching of the product.

Counterrotating compression or reduction rolls are used to compress laminated raw doughs in the production of crackers. The laminate is passed through the nip of one or more pairs of smooth-surfaced rolls with each of the two major surfaces of the laminate in contact with a roll surface. The laminate undergoes compression which makes the individual shred layers in the compressed laminate and in the baked product non-discernible to the naked eye. Such extensive thickness reduction would destroy the shred pattern and filamentous appearance of a shredded laminate. Additionally, removing or lifting of a shredded laminate from its conveyer belt and passing the shredded laminate unsupported through counterrotating compression rolls would tend to result in tearing of the laminate.

Use of only a single or top roll to substantially compress a laminate against its supporting conveyer belt has been found to result in distortion of the shred pattern or sticking of the laminate to the roll. Distortion tends to occur due to relative movement between the laminate and belt, or due to substantial differences in speed between the belt and the compression roll. For example, downward pressure exerted by the compression roll upon the top surface of the laminate tends to slow or even stop the underlying, laminate-supporting conveyer belt while the speed of the compression roll is maintained substantially constant. This may cause gathering or collecting of the laminate as it enters the space between the roll and belt and distortion or destruction of the surface shred pattern.

The present invention provides a method and apparatus for producing thin, crisp shredded snacks having a substantially flat, chip-like appearance and texture. The chip-like snacks may be produced by compressing a shredded laminate to avoid the formation of a puffed or pillowed appearance of shredded ready-to-eat cereal biscuits or the thick cracker-like appearance of shredded wafers. Even though the laminate undergoes substantial compression, the substantially flat chip-like products exhibit a substantially uniform shredded, net-like appearance upon their major surfaces, and visually discernible individual shred layers. The strength of the laminate is sufficient to continuously undergo cutting, transferring, and packaging operations during mass production without tearing or breaking. The shreds provide visual attractiveness, a unique, crispy texture, and robust flavor. The baked chip-like shredded snacks are sufficiently strong for dipping into and scooping of dips or sauces without breaking. The shredded snacks may be produced continuously using conventional ready-to-eat shredded cereal shredding mills.

SUMMARY OF THE INVENTION

Thin, crisp, chip-like shredded snacks are continuously produced by supporting a laminate of cooked, net-like sheets on a conveyer belt, and passing the supported laminate and belt between at least one pair of counterrotating compression rolls. The substantial compression of the laminate provides a thin, flat, chip-like appearance rather than a puffed or thick biscuit or cracker appearance. The compression is conducted so as to avoid substantial movement or slippage of the laminate relative to the belt which would substantially disrupt or distort the shred pattern of the laminate. Air voids and inter-layer spacing are substantially reduced and inter-layer adhesion is substantially increased by the compression so that upon baking the compressed laminate separation of the layers and puffing is substantially eliminated. The thickness of the laminate may be reduced in the compression rolls by at least about 35%, generally from about 45% to about 60%, while retaining a visible shred pattern Additionally, at least substantially all, or all of the individual shred layers are generally visible to the naked eye upon breaking a baked piece perpendicularly to its major surfaces.

The bottom, belt-supporting compression roll helps to maintain the linear speed of the commonly or separately driven conveyer belt as the top roll compresses the laminate against the top surface of the belt. The linear velocity of each of the bottom and top rolls may be at least substantially or essentially the same as the linear velocity or speed of the laminate-supporting conveyer belt which passes between the counterrotating compression rolls.

The thickness of the compressed laminate exiting the nip of the last pair of compression rolls is such so as to provide a thin, chip-like appearance upon baking. Generally, prior to any compression in the counterrotating compression rolls, the thickness of the laminate may range from about 0.070 inch to about 0.150 inch. The number of net-like sheets may be from 3 to 7, preferably from 4 to 6, most preferably 5. Upon completion of the compression, the thickness of the compressed laminate may range from about 0.035 inch to about 0.065 inch, preferably from about 0.055 inch to about 0.062 inch.

The compressed laminate may then be cut, and slit, and then baked. The cutting operation may partially or completely cut the sheets into strips of shaped pieces. The slitting operation may completely cut or score the strips so as to provide scored strips of unbaked snacks with the unbaked snacks tenuously connected to each other. In preferred embodiments of the invention, the compressed laminate may be partially cut into triangular shaped pieces by a rotary cutter having blunt cutting edges or surfaces without substantial generation of scrap or recycle material. The partially-cut, compressed laminate may be cut longitudinally in the direction of movement of the conveyer belt, and then transversely to the direction of movement of the conveyer belt. To reduce breakage during and after cutting, the laminate is preferably cut so that the apex or point of a triangle in one row does not touch or intersect the apex or point of another triangle located in an adjacent row. It is also preferable to form or cut the triangular pieces with rounded, blunted or flat corners so as to eliminate sharp points which may break-off during rotary cutting or subsequent slitting or transferring of the cut laminate.

Oil and additives such as flavorants and seasoning may be topically applied to the laminated structure before or after baking. The method of the present invention may be used for the production of full-fatted, reduced fat, low-fat, or no-fat shredded chip-like snacks.

The apparatus for the continuous production of thin, crisp, chip-like shredded snacks having a shredded appearance in accordance with the present invention includes a plurality of pairs of shredding rolls or mills for forming cooked grains or berries into a laminate. The shredding mills may be located above a conveyer belt upon which the individual layers are deposited to form the non-compressed laminate. The conveyer belt, or another conveyer belt, may be used for supporting and conveying the laminate between at least one pair of counterrotating compression rolls. Each pair of rolls may have an upper roll for contacting the top surface of the laminate, and a lower roll for contacting the bottom surface of the conveyor belt for supporting and conveying the belt and the laminate. Separate drives or a common drive may be used to drive the upper and lower rolls at substantially the same linear velocity as the belt so as to retain a shredded net-like appearance of the laminate as it is conveyed and compressed. The compressed laminate may be transferred to another conveyer belt where it may be partially cut by a rotary cutter. The rotary cutter preferably has circumferential rows of blunt edged, triangular cutting elements for partially cutting or forming the compressed laminate into triangular pieces. The triangular cutting elements are preferably arranged so that the apex of a triangular cutter of one row does not intersect the apex of the triangular cutter of an adjacent row. Additionally, the triangular cutting elements are preferably shaped so as to form the triangular pieces with blunted or flattened corners.

DETAILED DESCRIPTION OF THE INVENTION

A shredded chip-like snack having a substantially uniform shredded net-like appearance and crisp, shredded texture is obtained by substantially compressing a laminate of net-like sheets of cooked, shredded grains or berries. The compression substantially reduces or eliminates air pockets or inter-layer spacing and enhances interlayer adhesion so as to prevent the development of a puffed, pillowed, or thick biscuit or cracker-like appearance. Even though the laminate undergoes substantial compression, the substantially flat, unpuffed, chip-like products exhibit a substantially uniform shredded, net-like appearance upon their major surfaces. Additionally, individual shred layers are visually discernible in the baked product when it is broken and viewed in cross-section. The strength of the laminate is sufficient to continuously undergo cutting, transferring, and packaging operations during mass production without tearing or breaking. The baked chip-like shredded snacks are sufficiently strong for dipping into and scooping of dips or sauces without breaking.

Various grains may be used to produce chip-like shredded snacks in accordance with the present invention. Examples of grains which may be used are wheat, oats, barley, rye, corn and mixtures thereof. In the preferred embodiment whole grain soft wheat or whole wheat berries are used. In embodiments of the invention, whole grains, which are at least partially or fully defatted, such as defatted whole wheat berries, may be used alone or in admixture with full-fatted whole grains.

The snack chips of the present invention may be full-fatted, reduced fat, low-fat, or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers, or biscuits or wafers, used as snacks, and for cookies, the reference amount is 30 grams. Thus, the fat content of a low-fat cracker, wafer, or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product. A no-fat wafer having a label serving size of 32 grams would have a fat content of less than 0.5 grams per 32 grams or less than about 1.56% by weight, based upon the weight of the final product.

Oleaginous compositions which may be used in producing full-fat, reduced fat, or low-fat shredded chips in accordance with the present invention may include any known shortening or fat blends or compositions useful for baking applications, and they may include conventional food-grade emulsifiers. Vegetable oils, lard, marine oils, and mixtures thereof which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention include partially hydrogenated soybean oil, palm oil, and mixtures thereof.

In embodiments of the invention, the amount of vegetable shortening or fat topically applied to shredded products may be reduced by more than 25 percent by weight to obtain reduced fat products having, for example, less than about 12 weight percent fat, preferably less than 10% by weight fat, based on the total weight of the baked, finished product.

To provide a more lubricious mouthfeel to reduced fat, low-fat or no-fat products, a hydrocolloid gum, preferably guar gum, may be employed to compensate for the fat reduction as disclosed in U.S. Pat. No. 5,595,774 to Leibfred et al, the disclosure of which is herein incorporated by reference in its entirety. As disclosed in U.S. Pat. No. 5,595,774, the hydrocolloid gums are used in effective amounts which provide a lubricous, smooth, non-slippery mouthfeel to the baked product. Exemplary amounts of the hydrocolloid gum, preferably guar gum, which may be used range from about 0.15% by weight to about 1.5% by weight, preferably from about 0.25% by weight to about 0.45% by weight, based upon the total weight of the whole berries or grains. Other gums which may be used with guar gum include xanthan gum and carboxymethyl cellulose, and gums which form gels such as alginate gum, carrageenan gum, gum arabic, gum tragacanth, pectin, and locust bean gum, and mixtures thereof Generally, the greater the extent of shortening or fat reduction, the greater the amount of gum utilized to compensate for the loss of lubricity or loss of smoothness in mouthfeel.

The cooking of the grain or berry according to this invention can be done in any standard cooking equipment, such as a rotary cooker. The grain may be cooked at temperatures and humidities which hydrate and gelatinize the internal structure of the grains or berries such that only a pin head of white or free starch remains visible in the center of the kernel. In embodiments of the invention, the degree of gelatinization may for example, be at least 90%. The degree of starch gelatinization may be measured by differential scanning calorimetry (DSC). Generally, starch gelatinization occurs when: a) water in a sufficient amount, generally at least about 25 to 30% by weight, based upon the weight of the starch, is added to and mixed with starch and, b) the temperature of the starch-water mixture is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule, manifested in irreversible changes in properties such as granular swelling, native-crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following gelatinization in the dissolution of starch. It involves increased granular swelling, exudation of molecular components (i.e. amylose, followed by amylopectin) from the granules, and eventually, total disruption of the granules. See Atwell et al, "The Terminology And Methodology Associated With Basic Starch Phenomena," *Cereal Foods World*, Vol. 33, No. 3, Pgs. 306–311 (March 1988).

Exemplary cooking temperatures may range from about 190° F. to about 212° F. Cooking of the wheat grain in the preferred embodiment occurs at about 210° F. at atmospheric pressure using steam for about 30 to about 36 minutes. The cooking can include a "come-up time" of between 6.5 to about 8 minutes during which the temperature of the grain in the vat or cooking vessel is elevated from ambient temperature to the cooking temperature. But preferably, before cooking, the wheat grains are added to hot water at a temperature of about 170° to 190° F. in the cooker. The wheat grains may added to the hot water in a rotating cooker, for example, over a time period of about 50 to about 100 seconds. The amount of water used in the cooking step may range from about 40% by weight to about 70% by weight based upon the total weight of the grains or berries and added water. The moisture content of the cooked grain, after draining may range from about 35% by weight to about 60% by weight Similar cooking parameters may be used with other grains and grain mixtures.

During cooking, moisture tends to collect on the grain particles or berries. This moisture can increase the stickiness of the cooked grain and can cause handling problems when the grain is transferred to other apparatus. Mixing the grain in the cooking vat at low rotation speeds provides for even cooking and reduces lumping.

After draining of the excess cooking water and steam condensate formed during cooking, the cooked whole berries or grains may be discharged from the rotating cooker and transferred to a surface dryer and cooler. The cooked berries or grains may be dried and cooled to a temperature of less than about 85° F., preferably to a temperature of about 60° F. to about 80° F. The surface drying and cooling facilitates flow of the cooked grains as individual, discrete pieces. The dried, cooled grains or berries may have a moisture content of about 30% by weight to about 50% by weight, preferably from about 38% by weight to about 47% by weight for shreddability into strong, continuous shreds.

The cooked grains or berries may then be tempered or cured for a sufficient period of time to provide a uniform distribution of the water throughout the cooked whole grains. Tempering may be conducted at about 60° to 85° F. for about 12 to 16 hours. The tempering or curing step may be accomplished in one or more stages.

In embodiments where a hydrocolloid gum is used, as disclosed in U.S. Pat. No. 5,595,774, the hydrocolloid gum, preferably guar gum, in dry, particulate, or powdered form may be admixed or blended with the cooked, tempered, discrete grains or berries preferably at temperatures of about 60° F. to about 85° F. Batch or continuous mixers or blenders can be used to mix the gum and the cooked, tempered grains or berries to coat them with the gum substantially homogeneously. The ingredients are mixed so as to substantially retain berry or grain integrity and discreteness and an individual, free-flowing form. The dry gum sticks or adheres to the cooked, tempered moist grains, thus at least partially coating the grains without creating a sticky surface which would hamper or interfere with shredding. Upon shredding of the grains or berries, the gum coating or particles are incorporated into and onto the individual strands or net-like sheets of dough formed by the shredding rolls.

The cooked and tempered grains may be transferred by means of belt conveyors and/or bucket elevators to a hopper which feeds a screw conveyor. The latter may transfer the grain to a series of shredding rolls or mills via flow tubes or hoppers. An example of such a screw conveyor is that made by the Screw Conveyor Corporation, 704 Hoffman Street, Hammond, Ind. 46327. Suitable moisture contents of the grains for shredding may range from about 30 to about 50 percent, preferably from about 38 to about 47 percent by weight, based upon the weight of the grains.

Any conventional milling system can be used in the present invention. A conventional milling system for making a wafer or biscuit may be employed in producing the snack chips in accordance with the present invention. The conventional milling system can comprise a pair of closely spaced rolls that rotate in opposite directions with at least one of the rolls having circumferential grooves. Upon passing between the rolls, the dough is formed into long individual strings or strands. A circumferentially grooved roll can also be grooved transversely to the circumferential grooves for the production of a net-like sheet. When sheets are formed, the sheets are comprised of interwoven shreds or strings. When the rolls are held tightly together, the shreds or filaments partially separate from each other but are more or less connected. When the rolls are sprung slightly apart under pressure, the adjacent filaments can be united to each other by very thin webs or fins which stretch between them.

Upon passing between the rolls, the dough is deformed into the circumferential grooves and the optional crosshatching grooves. Each pair of rolls produces a dough layer having a plurality of generally parallel longitudinal strands and optionally a plurality of crosshatchings generally perpendicular to the strands. The crosshatchings and the longitudinal strands form an integral net-like sheet. The texture of each layer may be controlled by the number of crosshatchings in each layer forming the net-like sheets. The net-like sheets are preferably unwebbed or webless, i.e., the crosshatchings and longitudinal strands of each layer are not connected by a membrane. The use of an open space within the area formed by the longitudinal strands and the crosshatchings in the outer layers provides a more attractive product. Additionally, use of the open space in the inner layers avoids an excessively dense texture.

The longitudinal strands are produced by the circumferential grooves and may run in parallel with the direction of movement of an underlying conveyor. The crosshatchings of the dough layer are produced by the crosshatching grooves and may run generally perpendicular to the direction of movement of the conveyor.

The shredding mills may be arranged in a linear series along the common underlying conveyor. Each of the shredded dough layers or sheets may be deposited on the conveyor in super-position, with their longitudinal strands running in the same direction.

Conventional shredding systems which can be used in the process of the present invention are disclosed in U.S. Pat. Nos. 502,378; 2,008,024; 2,013,003; 2,693,419; 4,004,035; and Canadian Pat. No. 674,046.

The first and last one or more shredded dough layers to be deposited or laminated may have a number of crosshatchings so as to provide a region of denser texture or higher density in the chip. The first layer which is laid down upon the conveyor belt preferably has a sufficient number of crosshatchings to provide a more stable bed for the depositing of subsequent shred layers. Additionally, the outside appearance of the product is enhanced by the presence of crosshatchings as is the initial impression of crispness upon eating. For a 5 inch diameter shredding roll the number of crosshatchings may be about 45 or more, equally spaced about the roll. Five inch diameter rolls may generally have: (1) about 18 to 22 circumferential grooves per inch, and (2) up to about 120 equally spaced crosshatching grooves. Larger or smaller diameter rolls may also be used with about the same frequency of grooves as the five inch diameter rolls.

The dough layers which are deposited between the outer layers providing a denser texture or higher density may have a decreased number of crosshatchings so as to provide a region of lighter texture or lower density in the interior of the chip. The number of crosshatchings in each layer may be the same or different.

In embodiments of the invention, at least 30 percent of the total number of net-like sheets may provide one or more regions of dense texture or higher density. In preferred embodiments, each layer has the same number of crosshatchings. For increased durability, crispness, and visual appearance, 120 crosshatchings for a five inch diameter roll is preferred.

The depth of the circumferential grooves of the shredding rolls may be from about 0.010 inch to about 0.023 inch, preferably from about 0.016 inch to about 0.021 inch. Groove depths of less than about 0.010 inch tend to require too many layers to achieve a desired weight per piece. The net-like sheets when laminated upon one another, do not necessarily line up exactly so that one layer is superimposed exactly on another layer. The greater the number of layers, the more likely the openings in one net-like sheet will be at least partly covered by the shreds of another net-like sheet. Thus, increasing the number of layers to achieve a given piece weight tends to result in a denser laminate and loss of shred integrity upon compression in the compression rolls. The use of groove depths greater than about 0.023 inch tends to result in too dense of a laminate which is difficult to bake out to a crisp, chip-like texture.

Generally, the total number of net-like sheets may range from three to seven, preferably from four to six. The snack chips of the invention preferably have five net-like sheets. If the number of sheets is less than three, continuous, consistent production tends to be disrupted. The laminate tends to stick to or slip on the belt or compression roll upon substantial compression of a laminate which is relatively thin prior to compression. Additionally, with too few layers, the baked product tends to be too fragile for handling on mass production packaging equipment or for dipping. If the number of sheets or layers is greater than seven, upon compression to achieve a desirable, chip-like thinness, the laminate becomes too dense and difficult to bake out to a crispy texture. In addition, excessive compression may result in a loss of a distinctive, shredded appearance.

The thickness of the laminate is substantially reduced to achieve a thin, chip-like appearance and crispy texture upon baking without substantially destroying the shredded net-like appearance of the laminate. Prior to compression, the thickness of the laminate may generally range from about 0.070 inch to about 0.150 inch. Generally, the thickness of the laminate is reduced by at least about 35%, generally from about 45% to about 60% of its thickness prior to compression. Compression of the laminate to substantially reduce its thickness may be achieved by passing it between at least one pair of counterrotating compression rolls while it is supported upon and transported by a conveyer belt. Where more than one pair of compression rolls are employed, the total thickness reduction may be approximately equally divided between the pairs of rolls. Use of a single pair of counterrotating compression rolls is preferred for achieving the substantial compression of the laminate.

Supporting the laminate upon a belt while it is being compressed helps to avoid excessive stretching and tearing or sticking of the laminate during compression and transport through the rolls. Each pair of counterrotating rolls may comprise a top roll which contacts the top surface of the laminate, and a bottom roll which contacts the bottom surface of the conveyer belt which supports the laminate. The nip or gap between the counterrotating rolls and their relative rotational speeds are set so as to substantially compress the laminate while avoiding: 1) substantial sticking of the laminate to the upper roll, or 2) substantial movement or slippage of the laminate relative to the belt, either of which would substantially disrupt or distort the shred pattern of the laminate as it is compressed. The bottom roll helps to maintain the linear speed of the separately driven conveyer belt as the top roll compresses the laminate against the top surface of the belt.

In embodiments of the invention, the rotational speeds of the top and bottom rolls of a pair of counterrotating rolls may be at least substantially the same, or essentially the same, depending upon the relative diameters of the rolls. If different diameter rolls are used, their rotational speeds, or angular velocities, may be adjusted to provide at least substantially the same linear velocity ($v=r\omega$ where v is the linear velocity at a point on the surface of the roll, r is the radius of the roll, and $\omega$ is the angular velocity of the roll). In preferred embodiments, the diameters of the counterrotating compression rolls are the same and they are rotated at the same speed. Also, the linear velocity of each roll may be at least substantially or essentially the same as the linear velocity or speed of the laminate-supporting conveyer belt which passes between the counterrotating compression rolls. In preferred embodiments, the linear velocity of the lower and upper rolls of the counterrotating rolls, may be slightly higher, for example about 1% to about 3% higher than the linear velocity of the conveyer belt passing through them. This helps to assure that the stretchable elastic dough does not deleteriously gather, bunch-up, or back-up at the entrance to the nip between the top roll and the belt. The slightly slower speed of the belt relative to the rolls helps to pull the dough through the nip. Slight stretching of the dough as it is pulled through the nip does not substantially distort the shred pattern because of the elastic properties of the dough.

The rolls may be separately driven or preferably driven by a common drive. Conventional drives may be used to drive the counterrotating rolls and the laminate-supporting conveyer belt which passes between the rolls.

The top and bottom rolls of each pair of compression rolls and the laminate-supporting conveyer belt passing through them can be driven synchronously either independently or through a common drive. Synchronization may be accomplished mechanically using gears, belts, and pulleys in conventional manner. Each pair of serially arranged counterrotating compression rolls may be driven individually or in combination with each other. One or more of the pairs of compression rolls may be driven in combination with the conveyer belt. If separate driving motors are used for driving the counterrotating compression rolls and belt, a conventional feedback control system may be employed for synchronizing the rotational and/or linear speeds of the rolls and the linear speed of the belt. The drive or drives can include a conventional variable speed control such as an infinitely variable speed control for synchronizing the linear speeds of the belt and rolls. An infinitely variable differential drive which may be used is made by Candy Manufacturing Co., Inc., 626 Grove Street, Evanston, Ill. 60201, and is disclosed in U.S. Pat. No. 3,563,104, herein incorporated by reference in its entirety. In a preferred embodiment using a common drive, this drive can include synchronous drive belts, gears and pulleys for maintaining the conveyer belt and compression rolls in synchronization.

The laminate is compressed by the counterrotating rolls without cutting of the laminate or without molding of the laminate into individual pieces. The compression or thickness reduction is at least substantially uniform across the width of the laminate. The compression provides a thin, cooked, but dough-like compressed laminate and helps to prevent substantial puffing or expansion upon subsequent baking. The thickness of the compressed laminate exiting the nip of the compression rolls is such so as to provide a thin, chip-like appearance upon baking. Generally, the thickness of the compressed laminate may range from about 0.035 inch to about 0.065 inch, preferably from about 0.055 inch to about 0.062 inch. Even though the thickness of the laminate is substantially reduced, a substantially uniform shred pattern is visually apparent upon the opposing major surfaces of the baked product. Additionally, at least substantially all, or all of the individual shred layers are generally visible to the naked eye upon breaking a baked piece perpendicularly to its major surfaces. For example, if a baked piece is broken in about half, a cross-sectional viewing of each piece may generally reveal the same number, or substantially the same number, of shred layers or net-like sheets as were present prior to compression.

The moisture content of the laminate prior to compression and after compression is generally at least substantially the same. Moisture contents of the laminate prior to and after compression may range from about 30% by weight to about 50% by weight, preferably from about 38% by weight to about 47% by weight.

The laminates of shredded dough strands, layers or net-like sheets may then be cut, and slit using conventional equipment, such as rotary cutters and slitters. Dockering of the laminate is not necessary to prevent puffing or leavening. A non-dockered piece is preferable because it is more chip-like in appearance. Also, dockering of a compressed laminate tends to produce excessively dense portions which are difficult to bake out without scorching. The cutting operation may partially or completely cut the sheets into strips. The slitting operation may completely cut or score the strips so as to provide scored strips of unbaked snacks with the unbaked snacks tenuously connected to each other. In embodiments of the invention, the compressed laminate may be edge trimmed and then partially cut into shaped pieces by a rotary cutter without substantial generation of scrap or recycle material. Then, the partially-cut, compressed laminate may be cut longitudinally in the direction of movement of the conveyer belt, and then transversely to the direction of movement of the conveyer belt without substantial generation of scrap or recycle material. After baking and before or after the oil addition to the strips, the conveyor movement, etc., breaks apart the scored snack strips to provide individual snacks.

The shape of the snacks may be square, round, rectangular, elliptical parellelepiped, triangular and the like. Shapes which minimize or eliminate waste or recycle are preferred. A most preferred shape is a triangular or substantially triangular shape. To essentially eliminate waste, the triangles may be formed using a rotary cutter which cuts the compressed laminate so that the base of each triangle is parallel to the longitudinal axis or direction of movement of the laminate. To reduce breakage during and after cutting, the laminate is preferably cut so that the apex or point of a triangle in one row does not touch or intersect the apex or point of another triangle located in an adjacent row. In preferred embodiments, the cutter may cut the laminate into a plurality of longitudinal rows of triangular-shaped pieces so that the apex of a triangular piece of one row is located at or intersects about the midpoint of the base of a triangular piece of an adjacent row.

It is also preferable to form or cut the triangular pieces with rounded, blunted or flat corners so as to eliminate sharp points which may break-off during rotary cutting or subsequent slitting or transferring of the cut laminate. For example, vacuum may be used for lifting and transferring a partially cut laminate from one conveyer belt to another. The presence of substantial amounts of broken-off points may clog the vacuum equipment. One or more, preferably all three corners or apexes of the triangular pieces may be rounded, flattened or blunted. For example, to obtain flattened or blunted corners on a substantially equilateral or isosceles triangular shaped piece, each corner may be formed, cut, or shaped at least substantially parallel to its opposing side or at least substantially perpendicular to an adjacent side by the rotary cutter.

Figure 1:
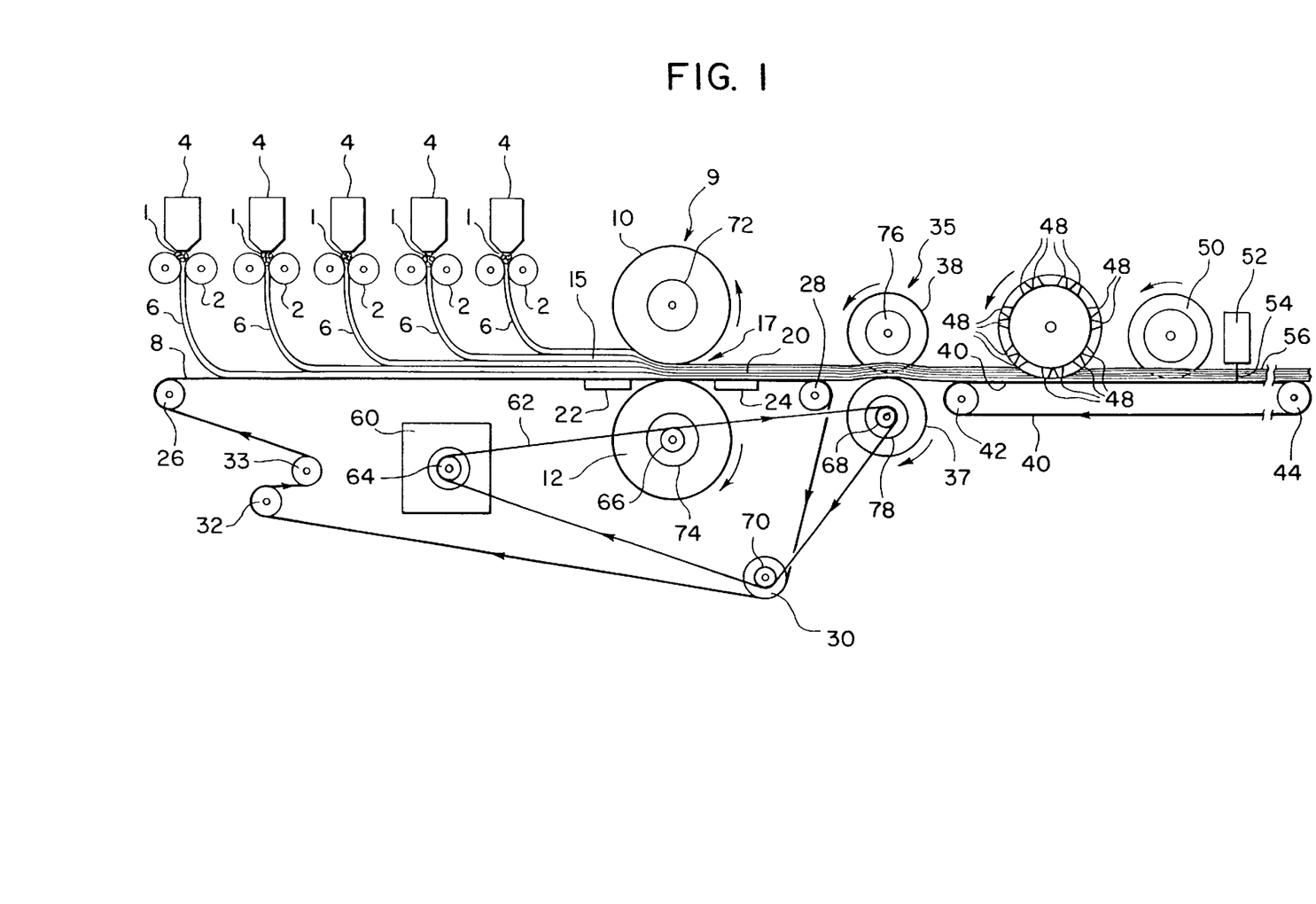
FIG. 1 schematically shows apparatus which may be used to produce thin, chip-like shredded snacks in accordance with process of the present invention.

Apparatus which may be used for producing the thin, shredded chip-like snacks of the present invention is shown schematically in FIG. 1. Cooked, tempered individual, free-flowing cereal grains or berries 1 may be supplied to five, serially arranged shredding mills 2 from feed hoppers 4 for producing five shredded net-like sheets or layers 6. The net-like sheets 6 are deposited one upon the other in substantial alignment. The conveyor belt 8 is aligned below the series of shredding mills 2 for receiving the individual layers as they are transported towards a pair of counterrotating compression rolls 9 comprising top compression roll 10 and bottom compression roll 12. The five-layer shredded laminate 15 and conveyor belt 8 are passed through the nip 17 between top roll 10 and bottom roll 12 to obtain a substantially compressed shredded laminate 20 exiting the nip 17.

Belt supports 22 and 24 may be provided upstream and downstream, respectively, of the nip 17 for supporting the belt 8 as it is transported through the nip. Conveyor belt 8 loops around and is supported by upstream end roller support 26 and downstream end roller support 28. After passing over end support 28, conveyor belt 8 loops around a sprocketed belt support roller 30 and then tensioning rollers 32 and 33.

The compressed laminate 20 is transported through an edge trimmer 35 for removal of rough edges or shreds along both sides of the compressed laminate 20. The edge trimmer comprises a bottom support roller 37 for supporting the compressed laminate 20 as it is edge cut by the top trimming or cutting roll 38. The lower support roll 37 and the trimming or cutting roll 38 rotate in opposite directions as the compressed laminate is trimmed and transported to a second conveyor belt 40.

Rotary cutting, longitudinal cutting, and transverse cutting may sequentially be performed on conveyor belt 40. Conveyor belt 40 may be supported by and loop around upstream roller support 42 and downstream roller end support 44. Rotary cutting may be performed using a rotary cutter 46 having blunt cutting edges 48 which substantially but do not completely cut through the compressed laminate 20. The rotary cutter 46 may have two rows of cutting elements which extend circumferentially around the rotary cutter 46. The partially cut compressed laminate 20 may then be transported by belt 40 to a slitter 50 which slits the compressed laminate 20 longitudinally between the rows. The slitting may be substantially but not completely through the compressed laminate for the attainment of rows of preforms, such as triangular preforms, of the snack chips. The partially cut, compressed laminate may then be transported by belt 40 to a traveling knife 52 having a cutting edge 54 which periodically severs the partially cut, compressed laminate 20 into a desired length. The resulting strips 56 of slightly-held-together preforms may then be transferred to a conveyor (not shown) for baking in a baking oven (not shown).

The conveyor belt 8, the pair of counterrotating compression rolls 9, and the edge trimmer 35 may be driven by a common drive 60. Drive chain 62 may engage chain sprocket 64 of drive 60, chain sprocket 66 of compression roller 12, chain sprocket 68 of bottom support roller 37, and chain sprocket 70 of sprocketed belt support roller 30 for rotational movement. Counterrotating compression rolls 10 and 12 may have gears 72 and 74, respectively, so that rotation of bottom roll 12 gearingly engages and rotates top roll 10. Intermediate gears are not shown. Similarly, upper trimmer gear 76 and lower trimmer gear 78 may be provided on edge trimmer 35 so that rotation of the bottom roll 37 causes rotation of the top trimming roll 38. Intermediate gears are not shown. Conveyor belt 40, rotary cutter 46, slitter 50, and knife 52 may be separately driven in conventional manner.

Figure 2:
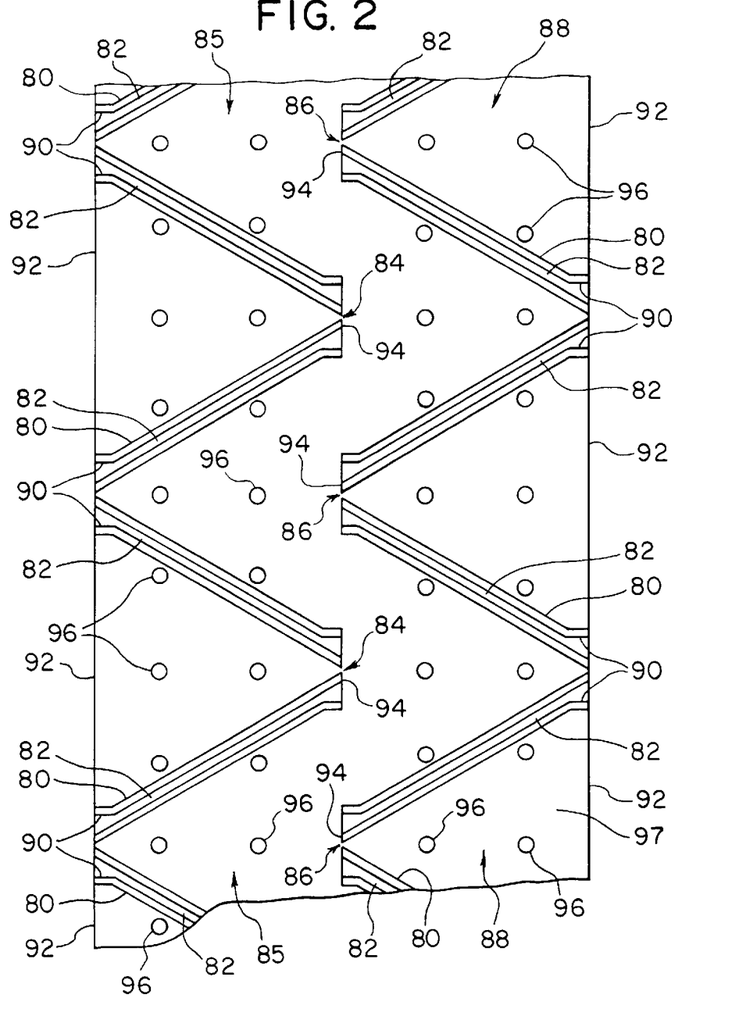
FIG. 2 shows a portion of a rotary cutter having triangular cutting elements for forming a compressed laminate into triangular shapes having flattened corners in accordance with the present invention.

FIG. 2 shows a portion of the cutting surface of rotary cutter 46 for a preferred embodiment of the invention wherein triangular pieces having blunted or flattened corners are produced. As shown in FIG. 2, cutting or forming elements 80 have blunted cutting or forming edges 82. As shown in FIG. 2, the triangular cutting elements are arranged so that the apex 84 of a triangular cutter 80 of circumferential row 85 does not intersect the apex 86 of the triangular cutter 80 of circumferential adjacent row 88. Additionally, each triangular cutting element includes two corner portions which are substantially perpendicular to the base 92 and one corner portion 94 which is substantially parallel to the base 92 so that the triangular pieces are formed with blunted or flattened corners. The rotary cutter may include radially disposed air passages 96 which extend from the surface 97 of the rotary cutter 46 towards an interior annular air passageway (not shown) to help prevent sticking of the compressed laminate to the rotary cutter.

Figure 3:
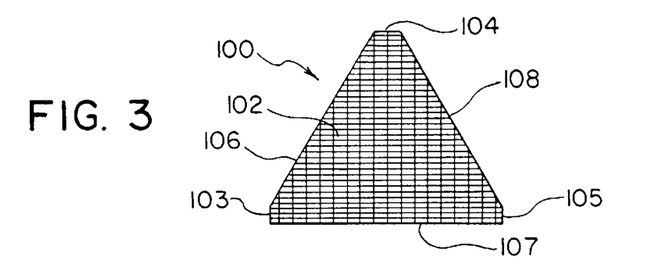
FIG. 3 shows a shredded chip-like snack having a triangular shape which may be produced using the rotary cutter of FIG. 2.

FIG. 3 shows a baked triangular shaped snack chip 100 which may be produced in accordance with the method of the present invention using a rotary cutter 46 having cutting elements 80 such as shown in FIG. 2. The snack chip 100 of FIG. 3 has an at least substantially uniform shred pattern 102 and blunted or flattened corner portions or apex portions 103, 104, and 105. Side 106 has a corner portion 103 which is substantially perpendicular to base 107. Similarly, opposing side 108 has a corner portion 105 which is substantially perpendicular to base 107. The remaining corner portion 104 is substantially parallel to base 107. The blunted corner portions 103, 104, and 105 are substantially more resistant to breakage than pointed corners.

The compressed laminate may be dried, baked and toasted in conventional equipment. Suitable ovens for drying, baking and toasting the cut laminate include Proctor & Schwartz, Wemer-Lehara, Wolverine and spooner ovens containing forced air and gas fired burners and a conveyor. The laminates may be toasted to enhance the flavor and brown the edges of the snacks. Baking of the compressed laminate does not substantially puff or leaven it and provides a substantially flat, thin, chip-like appearance.

Temperature profiles used in the oven for drying, baking and toasting of the compressed, laminated preforms may generally be within the range of about 200° to about 600° F. The baling is preferably performed in a zoned oven using low oven velocity to avoid excess curling, separating or warping of the strips during baking. The total time for drying, baking and toasting may be such so as to avoid browning (except on the edges of the snacks). It depends upon the number of shred layers, the size of the shredded product and the type of oven. The total time for drying, baking and toasting may range from about 3 minutes to about 10 minutes.

The color of the final baked product can be a substantially uniform off-white to golden tan color. The product may be topped with salt (for example, 0.5 to 2 weight percent, based on the total product weight) prior to baling. The salt provides flavor and flavor enhancement. Some of the salt (NaCl) can be replaced with KCl or other salt substitutes.

The fat or shortening, when used in embodiments of the invention can be applied, preferably by spraying in oil form, to the top and bottom surfaces of baked strips of snacks having no added fat or having only fat inherent in the cereal grain. Generally, whole wheat berries have an inherent fat content of about 2% to 4% by weight. See, *Wheat: Chemistry and Technology*, Vol. II, Pomeranz, ed., Amer. Assoc. of Cereal Chemists, Inc., St. Paul, Minn., p. 285 (1988). In embodiments of the invention, the topical application of oil to baked snacks having no other added fat may result in baked products having a total fat content of less than about 12%, preferably less than about 10% by weight. In other embodiments the amount of topically applied oil may be less than about 8% by weight, for example less than about 6% by weight, based upon the weight of the chip-like, shredded snack. Use of a hydrocolloid gum provides for obtaining a slippery or smooth mouthfeel and a glossy appearance even with no added fat.

The chip-like shredded snacks may contain one or more additives (e.g., vitamins, minerals, colorants, flavorants, etc.) at effective levels of concentration. Exemplary thereof are sugars such as sucrose, fructose, lactose, dextrose, and honey, polydextrose, dietary fiber, seasonings, such as onion, garlic, parsley, and bouillon, malt, wheat germ, nuts, cocoa, flavorants such as fruit flavoring, cracker flavoring, cinnamon, and vanilla flavoring, acidulants such as citric acid and lactic acid, preservatives such as TBHQ, antioxidants such as tocopherol and BHT, food colorant, emulsifiers such as Myvatex® (a blend of distilled monoglycerides manufactured by Eastman Kodak), sodium stearoyl lactylate, lecithin, and polysorbate 60, and vitamins and/or minerals. Examples of suitable vitamins and minerals include B-complex vitamins, soluble iron compounds, calcium sources such as calcium carbonate, vitamin A, vitamin E, and vitamin C. Also, non-fat dry milk solids (i.e., milk powder) or soybean protein may be added in an amount sufficient to create a final protein level of from about 10 to about 20 weight percent. Such additional ingredients may range up to about 30 weight percent, based on the total dry weight of the final product.

The additives, such as vitamins and minerals, may be dry blended with an optional hydrocolloid gum and then the dry blend may be admixed with the cooked, tempered wheat berries. In other embodiments, enrichment with vitamins and minerals and/or other additives may be achieved by blending with the blended grain and optional gum mixture. For example, a dry multi-vitamin premix may be added with simultaneous mixing to a gum coated grain mixture at the entry of a screw conveyor to form a homogeneous composition. The resulting composition may be fed or dropped into a hopper, which supplies milling rolls. The multi-vitamin and optionally gum-coated grain composition may then be milled in shredding rolls and formed into snacks.

Additives or fillings, particularly those which may adversely affect shredding, may also be incorporated into the shredded baked goods of the present invention by depositing them between shred layers during formation of the dough laminate. Sucrose, fructose, lactose, dextrose, polydextrose, fiber, milk powder, cocoa, and flavorants are exemplary of additives which may be deposited. Exemplary filings for inter-shred layer deposition include fruit paste fillings, no-fat cheese powder fillings, confectionery fillings, and the like. The additives or fillings may be full-fatted, no-fat, reduced-fat or low-fat.

Additives are preferably topically applied rather than applied between layers so as to not adversely affect a thin, chip-like appearance. The additives may be topically applied to the laminated structure before or after baking. The topically applied oil may be used as a carrier for one or more additives, such as flavorants or seasonings.

Products of the present invention may have a moisture content of less than about 5% by weight, preferably about 0.5 to about 3 weight percent, more preferably about 1 to 2 weight percent, based on the total weight of the baked, finished product. The final product may be baked to a shelf stable relative humidity or "water activity" of less than about 0.7, preferably less than about 0.6. It may have a shelf stability of at least about 2 months, preferably at least about 6 months, when stored in proper, sealed packaging.

The following examples further illustrate the present invention wherein all parts and percentages are by weight and all temperatures are in °F., unless otherwise indicated:

EXAMPLE 1

The ingredients and their relative amounts which may be used to produce a thin, crisp, chip-like shredded snack are:

| Ingredient | Relative Amount By Weight |
| --- | --- |
| soft white wheat berries (about 13% by weight water, and about 2.75% by weight fat) | 100 |
| water | 136 |
| soybean oil, partially hydrogenated | 12.2 |
| salt | 1.3 |
| Total | 249.5 |

Water at a temperature of about 170° F.–190° F. may be added to a rotary cooker. Then, the soft white wheat (whole grain) may be added to the rotating cooker within about 60–70 seconds. The mass in the cooker may then be heated with steam and cooked for about 30 to 36 minutes at 210° F. or until a pinhead of white remains visible in the kernel. The cooked mass in the cooker may then be drained for about 6 to 12 minutes. The cooked, drained wheat berries may then be discharged from the rotating cooker to a surface dryer and cooler. The wheat berries may be cooled about 30 minutes to a temperature of less than about 80° F. The cooled wheat berries may then be conveyed to curing (tempering) tanks. After 6 to 8 hours of curing, the wheat berries may be transferred to a second stage tank for an additional 6 to 8 hours of curing or tempering. The tempered wheat berries may have a moisture content of about 42% by weight to about 45% by weight for shredding.

The discrete, free flowing wheat berries may then be conveyed to a surge hopper for feeding to five shredding mills which are arranged in a linear series along a common conveyor. Each shredding mill may comprise a pair of counterrotating rolls held in mutual contact for the production of net-like sheets. The rolls of the five mills may each have a groove depth of about 0.016 inch to 0.021 inch and 120 cross-hatching grooves.

The net-like cereal dough sheets produced by the shredding mills may be continuously deposited upon a continuous conveyor belt to form a five layer laminate having a thickness of about ⅛ of an inch. The five layer laminate, while supported on the conveyer belt may be continuously compressed between smooth surfaced, non-grooved, stainless steel counterrotating compression rolls. The compression rolls may have the same diameter and may be driven by a common drive at the same rotational speed. The linear speed of each compression roll may be the same and the linear speed of the belt may be about 1% slower than the linear speed of the compression rolls. The compression rolls may be moved or maintained in position by the use of air cylinders Air cylinder pressures of about 60 psi to 80 psi may be used to maintain a desired gap between the rolls as the belt and laminate continuously pass between the counterrotating compression rolls. The gap between the upper roll surface and the top surface of the conveyer belt may be from about 0.058 inch to about 0.062 inch to obtain a compressed laminate having a thickness of about 0.058 inch to about 0.062 inch. The moisture content of the laminate prior to compression and the moisture content of the compressed laminate may be about 42% by weight to about 45% by weight.

The compressed laminate may be conveyed to an edge trimmer to trim the longitudinal edges. The trimmed, compressed laminate may then be conveyed to a rotary cutter having a plurality of circumferential rows of triangular cutting or forming elements. The elements may partially cut or form the compressed laminate into rows of isosceles triangle shaped preforms having blunted or flattened corners. The triangular preforms are joined at their peripheries by a thin layer of dough resulting from only partially cutting or scoring of the compressed laminate. The partially cut compressed laminate may then be cut or slit longitudinally, and then cut transversely to the direction of movement of the laminate to form strips of scored, triangular dough preforms. The salt may be deposited upon the preforms by gravimetric salters.

The salted product may be transferred to a multizone band oven for drying, baking and toasting for about 5 to 7.5 minutes at temperatures ranging from about 200° F. to about 600° F. The baked product leaving the oven may have an end point moisture content of about 1.75% by weight, based upon the weight of the final product.

As the baked product strips exit the oven, the soybean oil may be topically applied as a fine spray to the top and bottom of the baked snack preform strips.

The baked preform strips may then be conveyed to packaging in a manner so that the scored strips of triangular snacks readily separate at the score line by motion, bumping, etc., into individual snack pieces. The snack pieces may be isosceles triangle shaped with blunted or flattened corners. The base may be about 1.7 inches long, and the two sides may each be about 1.6 inches long. The two blunted side portions perpendicular and adjacent to the base may each be about 0.1 inch long. The blunted side portion parallel to and opposite the base may be about 0.16 inch long. The thickness of the baked snack piece may be about 1/16 inch. The baked snack pieces may have a thin, flat, chip-like appearance and crisp, chip-like texture. The top and bottom major surfaces may have a substantially uniform shred pattern or embossed or woven, shredded appearance and texture. Upon breaking the baked snack chips, the five shred layers may be seen by the naked eye in cross-section. The snack chips may be used for hand-to-mouth snacking and may be used for dipping without breakage.

EXAMPLE 2

The ingredients and their relative amounts which may be used to produce a thin, crisp, chip-like reduced-fat shredded wheat snack are:

| Ingredient | Relative Amount By Weight |
| --- | --- |
| soft white wheat berries (about 13% by weight water, and about 2.75% by weight fat) | 100 |
| water | 136 |

-continued

| Ingredient | Relative Amount By Weight |
|---|---|
| soybean oil, partially hydrogenated | 5.7 |
| salt | 1.3 |
| guar gum (about 13% by weight water) | 0.35 |
| Total | 243.35 |

The reduced-fat snacks may be produced as in Example 1 except to incorporate the guar gum into the product, the discrete, free flowing wheat berries obtained as in Example 1 may be conveyed pneumatically to a cyclone receiver located above a Thayer weigh scale. The guar gum may be separately transferred to a hopper above a screw driven particulate feeder. The cured wheat berry feeder and the guar gum feeder may be simultaneously started to feed each of the ingredients to a continuous blender. In the continuous blender, the wheat berries and dry guar gum may be admixed so as to coat the wheat berries substantially homogeneously with the guar gum while substantially retaining berry discreteness. The final blend may then be conveyed via a bucket elevator to a surge hopper for feeding to the five shredding mulls of Example 1.

The spray oil content of the baked snack chips may range from about 4.5% by weight to about 7.5% by weight and average about 6.0% by weight. The total fat content of the wafers may range from about 7.25% by weight to about 10.25% by weight and average about 8.75% by weight.

EXAMPLE 3

A low-fat shredded wheat snack chip may be produced using the ingredients and procedure of Example 2 except the relative amount of oil used for topical application to the baked product may be reduced so that the total fat content of the wafers range from 3% by weight to 6% by weight.

EXAMPLE 4

A sour cream and onion flavored shredded wheat chip snack may be produced using the ingredients and procedure of Example 1 except the salt may be replaced by a particulate sour cream and onion seasoning composition.

What is claimed is:

1. A method for the continuous production of a thin, crisp, shredded snack comprising:
   a) shredding cooked grains or berries to obtain a plurality of shredded sheets,
   b) laminating said net-like sheets to obtain a laminate of cooked, shredded sheets,
   c) substantially reducing the thickness of said laminate while transporting the laminate on a conveyer belt through counterrotating rolls to obtain a compressed laminate having a shredded appearance,
   d) forming the compressed laminate into pieces, and
   e) baking the pieces to obtain pieces having a thin, crisp, shredded texture and a shredded appearance.

2. A method as claimed in claim 1 wherein said counterrotating rolls reduce the thickness of the laminate by at least about 35%.

3. A method as claimed in claim 1 wherein four to six sheets are laminated to obtain a laminate.

4. A method as claimed in claim 1 wherein the thickness of the laminate prior to passing it through said counterrotating rolls is from about 0.070 inch to about 0.150 inch.

5. A method as claimed in claim 1 wherein the thickness of the compressed laminate is from about 0.035 inch to about 0.065 inch.

6. A method as claimed in claim 1 wherein the thickness of the compressed laminate is from about 0.055 inch to about 0.062 inch.

7. A method as claimed in claim 1 wherein said counterrotating rolls are each driven at the same rotational speed.

8. A method as claimed in claim 7 wherein said counterrotating rolls comprise a top roll which contacts the top surface of the laminate, and a bottom roll which contacts the bottom of said conveyer belt for preventing substantial movement or slippage of the laminate relative to said conveyer belt as the laminate is compressed against the conveyer belt.

9. A method as claimed in claim 1 wherein said sheets are obtained from grooved rollers having circumferential grooves having a depth of from about 0.010 inch to about 0.023 inch.

10. A method as claimed in claim 1 wherein the compressed laminate is formed into triangular-shaped pieces using a rotary cutter.

11. A method as claimed in claim 10 wherein said triangular pieces have flattened or blunt corners.

12. A method as claimed in claim 10 wherein the compressed laminate is partially cut into triangular-shaped pieces by said rotary cutter, then the partially cut compressed laminate is cut longitudinally in the direction of movement of the conveyer belt and then transversely to the direction of movement of the conveyer belt.

13. A method as claimed in claim 1 wherein the moisture content of the laminate before and after compression is at least about 35% by weight.

14. A method as claimed in claim 1 wherein said cooked grains or berries are wheat berries.

15. A method as claimed in claim 1, wherein said shredded snack is a chip.

16. A method as claimed in claim 1, wherein said shredded snack has a cross-hatched appearance.

17. A method for the continuous production of a thin, crisp, shredded wheat snack comprising supporting a laminate of four to six cooked, sheets of wheat on a conveyer belt, passing the supported laminate and belt between at least one pair of counterrotating rolls to compress the laminate while avoiding substantial movement or slippage of the laminate relative to the belt which would substantially disrupt or distort the shred pattern of the laminate as it is compressed, the thickness of the laminate being reduced by at least about 35% while retaining a visible shred pattern, and baking the compressed laminate to obtain a baked snack having a crisp, texture and shredded appearance.

18. A method as claimed in claim 17, wherein said shredded snack is a chip.

19. A method as claimed in claim 17, wherein said shredded snack has a cross-hatched appearance.

20. Apparatus for the continuous production of thin, crisp, shredded snacks having a shredded appearance comprising:
   a) shredding rolls for forming cooked grains or berries into a laminate of a plurality of shredded sheets,
   b) a conveyer belt for supporting and conveying said laminate between counterrotating compression rolls,
   c) at least one pair of counterrotating compression rolls for substantially reducing the thickness of said laminate while the laminate is supported and conveyed by said conveyer belt, each of said at least one pair of rolls comprising an upper roll for contacting said laminate, and a lower roll for supporting and conveying said conveyer belt,
   d) a drive for driving said upper and lower rolls so as to retain a shredded appearance of said laminate as it is conveyed and compressed, and e) a cutter for at least partially cutting the compressed laminate.

21. Apparatus as claimed in claim 20 wherein said conveyer belt is supported by plates upstream and downstream of said bottom roll.

22. Apparatus as claimed in claim 20 wherein said top and bottom rolls are driven at essentially the same rotational speed.

23. Apparatus as claimed in claim 20 wherein from four to six pairs of shredding rolls are used to form said grains or berries into said plurality of sheets.

24. Apparatus as claimed in claim 20 wherein said cutter at least partially cuts said laminate into triangular shaped pieces.

25. Apparatus as claimed in claim 24 wherein said cutter cuts said laminate into a plurality of longitudinal rows of triangular-shaped pieces so that the apex of a triangular piece of one row does not intersect the apex of a triangular piece of an adjacent row.

26. Apparatus as claimed in claim 25 wherein said cutter cuts said laminate into triangular-shaped pieces having blunt or flattened ends.

27. A shredded snack comprising four to six net-like sheets of cooked, shredded grains or berries which have been laminated and then substantially compressed and baked to obtain a thin, substantially flat, unpuffed, appearance and a crisp, texture, said snack having a substantially uniform shredded appearance.

28. A snack as claimed in claim 27 which is substantially triangular in shape, each of the corners of the triangle being blunt or flattened.

29. A shredded snack as claimed in claim 27, wherein said shredded snack is a chip.

30. A shredded snack as claimed in claim 27, wherein said shredded snack has a cross-hatched appearance.

* * * * *